United States Patent [19]
George et al.

[11] 3,732,045
[45] May 8, 1973

[54] APPARATUS FOR MAKING BRAKE SHOES

[75] Inventors: Howard Edward George, Chicago, Ill.; Jean Marie Guertin, St. Hyacinthe, Quebec, Canada

[73] Assignee: AMSTED Industries Incorporated, Chicago, Ill.

[22] Filed: Oct. 14, 1971

[21] Appl. No.: 189,362

[52] U.S. Cl. ................. 425/117, 425/127, 425/128, 425/234, 425/DIG. 54, 425/DIG. 55
[51] Int. Cl. ........................................... B30b 11/06
[58] Field of Search ...................... 425/234, 397, 117, 425/127, 128, DIG. 54, DIG. 55; 249/134

[56] References Cited

UNITED STATES PATENTS

| | | | |
|---|---|---|---|
| 2,943,347 | 7/1960 | Archibald | 425/397 X |
| 3,202,749 | 8/1969 | White | 425/DIG. 54 |
| 3,537,677 | 11/1970 | Cotton et al. | 249/134 X |
| 3,608,140 | 9/1970 | Ratcliffe | 425/117 |
| 3,609,819 | 10/1971 | Searle | 425/DIG. 55 |

*Primary Examiner*—J. Howard Flint, Jr.
*Attorney*—Walter L. Schlegel, Jr. et al.

[57] ABSTRACT

A heated brake shoe press has a longitudinal open end cavity defined by a base and cover. One end of the cavity may be closed by a movable platen. A movable plunger projects into the other end of the cavity and is slideably engaged with the cavity throughout its length. Inserts and liners are slideably engaged in the cavity in a given order and define a plurality of molding cavities that are fillable with moldable material. The heat, and the pressure exerted by the plunger configures the material in the molding cavities to a shape defined by the inserts and liners. After forming, the platen may be moved to an open position and the inserts and configured material may be pushed out of the cavity by the plunger. To accommodate such action and to reduce galling and scoring of the cavity walls, Teflon buttons are attached to the insert faces which engage the cavity wall.

4 Claims, 3 Drawing Figures

PATENTED MAY 8 1973 3,732,045

Inventors
Howard E. George
Jean M. Guertin
By Wm. L. Schlegel Jr.
Ralph M. Faust
Atty

APPARATUS FOR MAKING BRAKE SHOES

This invention relates to brake shoe presses for making composition brake shoes.

The present invention may be utilized to produce composition brake shoes having close tolerances and a uniform density in a minimal amount of time and with a minimal amount of labor. The brake shoe press may be further quickly and easily converted to accommodate a number of sizes and shapes of brake shoes.

The foregoing and other objects and advantages of the invention will become apparent from the following description and the accompanying drawings, wherein.

Figure 1:
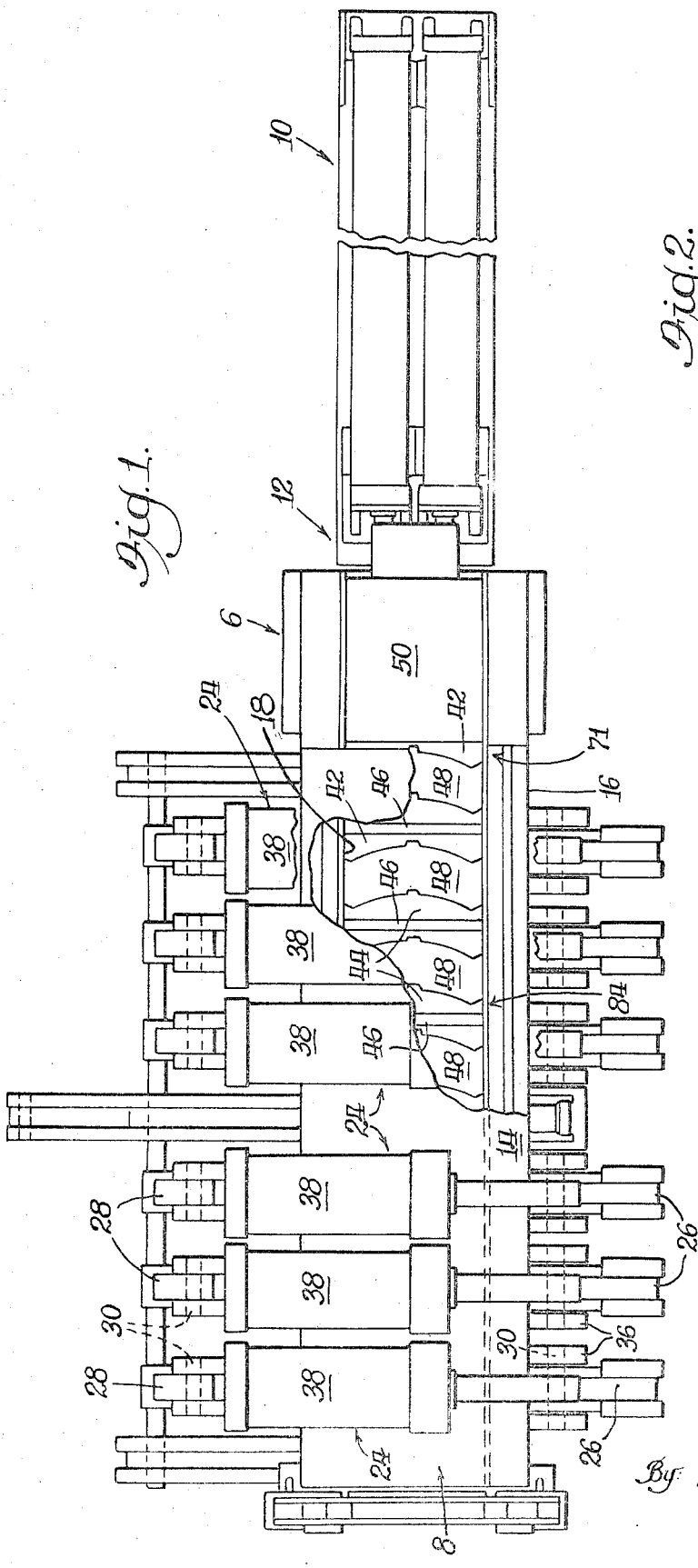
FIG. 1 is a fragmentary, top plan view of a brake shoe press embodying features of the invention.

Referring now to the drawings it is seen that FIG. 1 illustrates a brake shoe press 6 comprising a mold 8 and a ram unit 10 that are mounted on a frame 12, as shown in U.S. Pat. No. 3,608,140 which is incorporated herein by reference.

The mold 8 includes a cover 14 and a base 16 that define an elongated, open end cavity 18. The cavity 18 may be bound on three sides by the base 16 and on the fourth side by the cover 14. In a preferred embodiment the opposed sides and the upper and lower surfaces of cavity 18 are substantially flat and smooth and are respectively parallel to their opposed surface in any plane defining the longitudinal axis of the cavity.

In operation, the mold 8 is heated to a given temperature, e.g., 350°F. A given number of inserts 40, e.g., eight, each comprising a front die face 42, and a rear die face 44 may then be sequentially placed in the cavity 18 (FIG. 1). The front and rear faces 42 and 44 have a given configuration that defines a brake shoe cavity 48 having a known brake shoe design therebetween.

Composition, in the form of pre-formed briquets or loose aggregate, of known thermosetting brake shoe material may be placed in each brake shoe cavity 48.

The ram unit 10 may then be actuated to force a plunger 50 against the inserts 40 and composition. The pressure is increased until a given load, e.g., 3,500 pounds per square inch, is placed against the surface of the front and rear forming dies 42 and 44. This pressure forces the composition into the given configuration.

After the composition has been cured, the formed composition in cavity 48 and the inserts 40 are pushed out of the cavity 18.

Because of the abrasive character of the composition, and the number of inserts utilized, extremely high pressures are required, first to compact the composition between the inserts and secondly to push the cured brake shoes and inserts out of the main cavity. Further, the inserts tend to gouge and score the walls of the cavity. To overcome this problem, the inserts 40 are provided with a plurality of buttons 52 on each of the four faces which engage the walls of cavity 18. The buttons may be formed of tetrafluoroethylene, commonly called Teflon, but preferably is 25 – 35 percent by weight glass or graphite filled Teflon.

Figure 2:
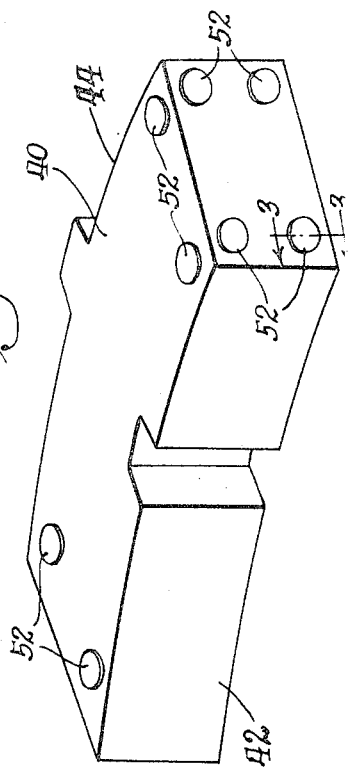
FIG. 2 is a perspective view of a typical insert as modified by the present invention.
Figure 3:
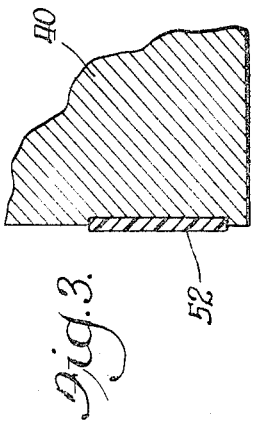
FIG. 3 is a fragmentary section taken on line 3—3 of FIG. 2.

In the preferred embodiment of FIG. 2, four buttons are provided on the top, bottom and each side of each insert, the buttons being about 1 inch in diameter and about one-sixteenth inch thick. To provide support, the buttons are recessed in the inserts and project beyond the faces about 0.004 inch. The amount of projection, as well as the button thickness and preferred diameter, may of course be varied within reasonable ranges. It has been found that the buttons not only permit much less pressure to be utilized in the pressing operation but also substantially eliminate galling and scoring of the walls forming the press cavity.

What is claimed is:

1. A press for making brake shoes having a composition body secured to a metal backing plate, the press comprising: a mold having a longitudinal elongated cavity comprising top, bottom and side walls; spaced inserts slideably received in the cavity and movable therethrough; the inserts together with said walls defining a plurality of individual brake shoe molding cavities; power means to move said inserts toward each other; and a plurality of buttons secured to each insert and spacing each insert from said walls, said buttons being formed of tetrafluoroethylene.

2. A press according to claim 1, wherein said buttons are formed of tetrafluoroethylene with a glass filler in the amount of 25 to 35 percent by weight.

3. A press according to claim 1, wherein said buttons are formed of tetraflouroethylene with a graphite filler in the amount of 25 to 35 percent by weight.

4. A press according to claim 1, wherein said buttons are recessed in said inserts and project outwardly thereof a distance of approximately 0.004 inches.

* * * * *